United States Patent
Jang et al.

(10) Patent No.: US 8,953,264 B2
(45) Date of Patent: Feb. 10, 2015

(54) POSITION DETECTING APPARATUS AND LENS BARREL ASSEMBLY INCLUDING THE SAME

(75) Inventors: Cheol-eun Jang, Suwon-si (KR); Sung-wook Choi, Changwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 110 days.

(21) Appl. No.: 13/447,461

(22) Filed: Apr. 16, 2012

(65) Prior Publication Data

US 2013/0057975 A1    Mar. 7, 2013

(30) Foreign Application Priority Data

Sep. 1, 2011    (KR) .................... 10-2011-0088530

(51) Int. Cl.
*G02B 7/02* (2006.01)
*G01D 5/244* (2006.01)

(52) U.S. Cl.
CPC ............ *G02B 7/023* (2013.01); *G01D 5/24442* (2013.01)
USPC ....................................................... 359/824

(58) Field of Classification Search
CPC ........................... G01D 5/24442; G02B 7/023
USPC .................................................. 359/822–830
See application file for complete search history.

(56) References Cited

U.S. PATENT DOCUMENTS

| 6,324,023 | B1 | 11/2001 | Nagaoka et al. | |
| 7,289,283 | B2 * | 10/2007 | Hattori | 359/819 |
| 7,864,460 | B2 * | 1/2011 | Hino et al. | 359/823 |
| 2006/0062560 | A1 * | 3/2006 | Ito et al. | 396/87 |

* cited by examiner

*Primary Examiner* — Scott J Sugarman
*Assistant Examiner* — Vipin Patel
(74) *Attorney, Agent, or Firm* — Drinker Biddle & Reath LLP

(57) ABSTRACT

Position detecting apparatus that has a high detecting precision and a lens barrel assembly including the same are disclosed. A position detecting apparatus is provided that includes a base; a magnetic scale spaced apart from the base by a first predetermined distance and movable in a first direction; a first adjustment portion coupled to the base to adjust a second distance from the base; and a sensor rotatably coupled to the first adjustment portion and that senses a change in a position of the magnetic scale.

13 Claims, 7 Drawing Sheets

POSITION DETECTING APPARATUS AND LENS BARREL ASSEMBLY INCLUDING THE SAME

CROSS-REFERENCE TO RELATED PATENT APPLICATION

This application claims the priority benefit of Korean Patent Application No. 10-2011-0088530, filed on Sep. 1, 2011, in the Korean Intellectual Property Office, the entirety of which is incorporated herein by reference.

BACKGROUND

1. Field of the Invention

The invention relates to a position detecting apparatus and a lens barrel assembly including the same, and more particularly, to a position detecting apparatus that has a high detecting precision and a lens barrel assembly including the position detecting apparatus.

2. Description of the Related Art

Photographing apparatuses, such as a digital camera, a digital video camera, or the like, include a device for moving a position of an optical element to perform auto-focusing (AF) by adjusting a position of an optical element, such as a lens, or to perform zooming. Recently, as the needs for reduced size and higher optical performance of a digital camera increase, there is a growing need to more precisely determine the position of an optical element.

Accordingly, a magnetoresistance sensor, which measures a position of a moveable optical element by attaching a magnetic scale to the movable optical element and detecting a change in a magnetic field occurring due to the magnetic scale, is being used. In this regard, in order to precisely measure the position of the optical element, there have been attempts to maintain a consistent distance between the magnetic scale and the magnetoresistance sensor. However, when the distance between the magnetic scale and the magnetoresistance sensor is adjusted, the magnetic scale and the magnetoresistance sensor may no longer be parallel to each other, thereby reducing position detection precision.

SUMMARY

The invention provides a position detecting apparatus that precisely detects a position of a movable member.

The invention also provides a position detecting apparatus that is modularized to independently adjust a distance and an angle between a sensor and a magnetic scale, and a lens barrel assembly including the position detecting apparatus.

According to an aspect of the invention, there is provided a position detecting apparatus including: a base; a magnetic scale spaced apart from the base by a first predetermined distance and movable in a first direction; a first adjustment portion coupled to the base to adjust a second distance from the base; and a sensor rotatably coupled to the first adjustment portion and that senses a change in a position of the magnetic scale.

The first adjustment portion may include a support portion coupled to the sensor; and a first adjusting member to adjust the second distance between the support portion and the base by moving the support portion in a second direction crossing the first direction.

The first adjusting member may be a bolt, and the support portion may include a first through-hole corresponding to the first adjusting member.

The base may include a thread groove corresponding to the first through-hole and screw-coupled to the first adjusting member.

The position detecting apparatus may further include a first elastic member between the base and the support portion.

The sensor may include a magnetoresistance sensor for sensing a change in a magnetic field generated due to movement of the magnetic scale and a supporting frame support the magnetoresistance sensor and rotatably coupled to the first adjustment portion.

The position detecting apparatus may further include a second adjustment portion moveably coupled to the first adjustment portion to adjust a rotation angle of the sensor.

One side of the sensor may be rotatably coupled to the first adjustment portion, and the other side thereof may rotate about the one side by the second adjustment portion.

The second adjustment portion may include a second adjusting member, and the second adjusting member may be a bolt.

The sensor may include a thread groove screw-coupled to the second adjusting member.

The position detecting apparatus may further include a second elastic member between the second adjusting member and the sensor.

The position detecting apparatus may further include a power transmitting member disposed between the second adjusting member and the sensor to transmit power.

According to another aspect of the invention, there is provided a lens barrel assembly including: a base; a movable barrel supporting an optical element, movable in a first direction with respect to the base, and comprising a magnetic scale on an outer circumferential surface of the movable barrel; a first adjustment portion coupled to the base to adjust a distance with respect to the base; and a sensor rotatably coupled to the first adjustment portion and disposed to face the magnetic scale to detect a change in a position of the magnetic scale.

The first adjustment portion may include a support portion coupled to the base; and a first adjusting member to adjust a second distance between the support portion and the base by moving the support portion in a second direction crossing the first direction.

The lens barrel assembly may further include a second adjustment portion moveably coupled to the first adjustment portion to adjust a rotation angle of the sensor.

BRIEF DESCRIPTION OF THE DRAWINGS

The above and other features and advantages of the invention will become more apparent in review of detail exemplary embodiments thereof with reference to the attached drawings, in which.

DETAILED DESCRIPTION

As used herein, the term "and/or" includes any and all combinations of one or more of the associated listed items.

Now, exemplary embodiments according to the invention will be described in detail with reference to the accompanying drawings.

Figure 1:
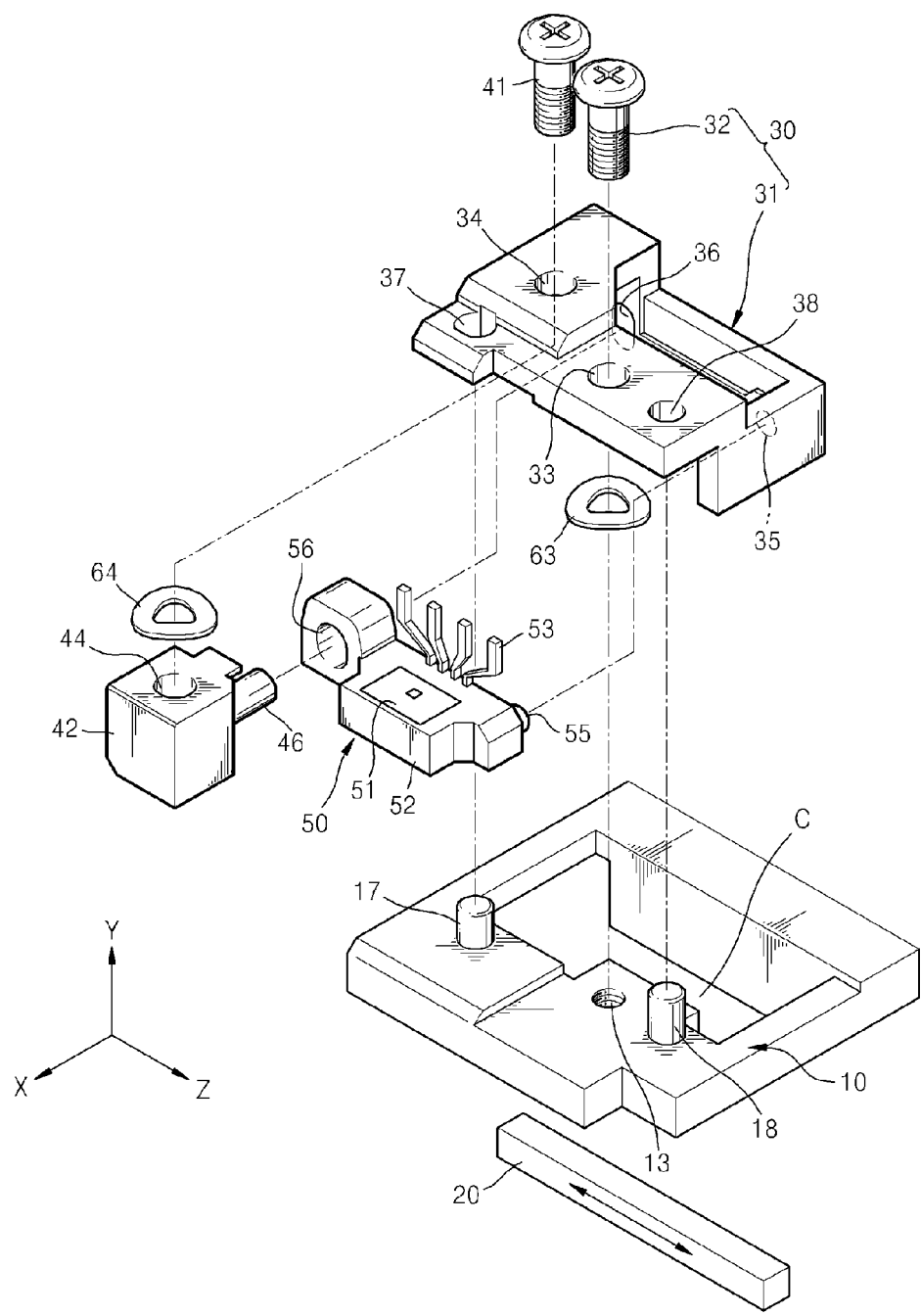
FIG. 1 is an exploded view of a position detecting apparatus, according to an embodiment of the invention.
Figure 2:
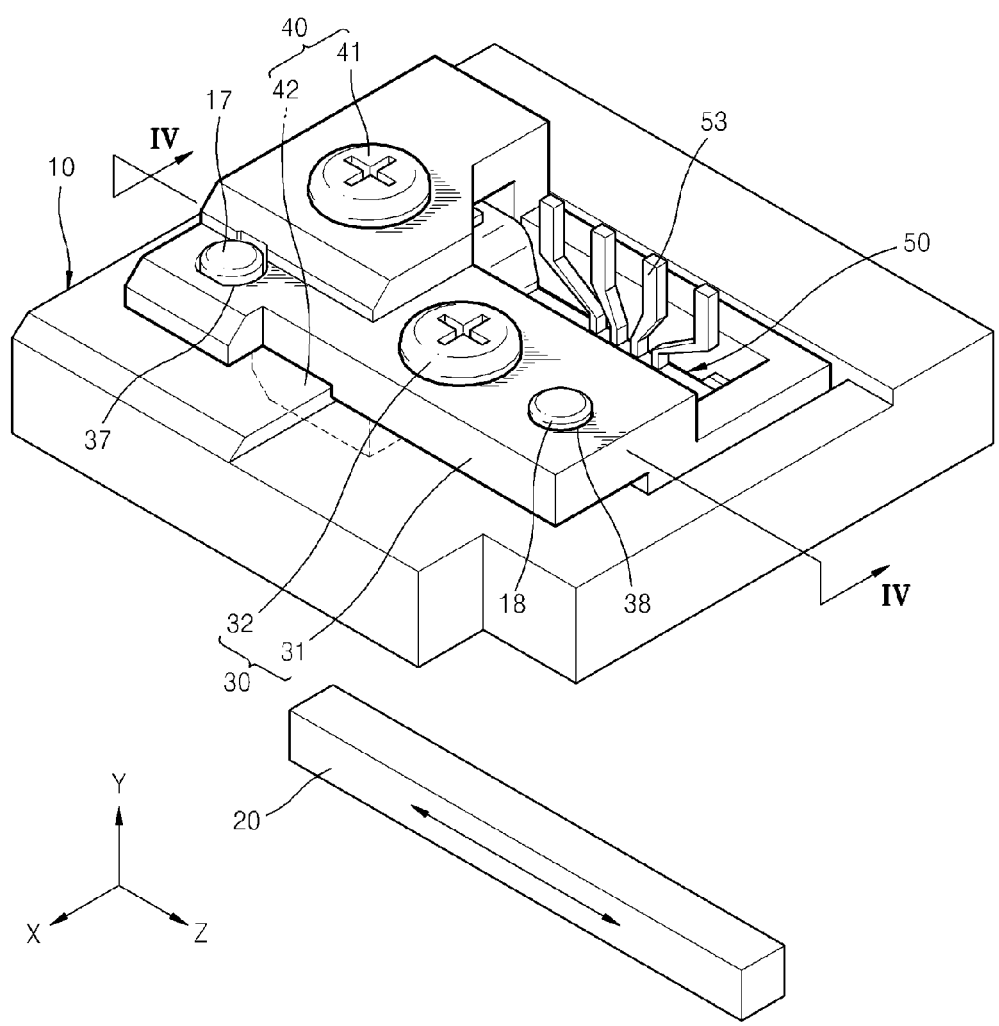
FIG. 2 is a perspective view of the position detecting apparatus of FIG. 1 formed by assembling the components illustrated in FIG. 1.
Figure 2:
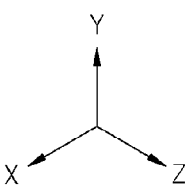

FIG. 1 is an exploded view of a position detecting apparatus, according to an embodiment of the invention. FIG. 2 is a perspective view of the position detecting apparatus of FIG. 1, which is formed by assembling the components illustrated in FIG. 1.

Referring to FIGS. 1 and 2, the position detecting apparatus includes a base 10, a magnetic scale 20 spaced apart from the base 10 by a predetermined distance and movable in a first direction (a Z-axis direction), a first adjustment portion 30 moveably coupled to the base 10 to adjust a distance with respect to the base 10, and a sensor 50 rotatably coupled to the first adjustment portion 30 to sense a change in a position of the magnetic scale 20.

The magnetic scale 20 may move in the first direction with respect to the base 10, and a magnetic pattern in which N-poles and S-poles are alternately disposed in the first direction in a regular pattern is formed in a surface of the magnetic scale 20 (see FIG. 6) facing the sensor 50. Due to the magnetic pattern, a magnetic field having different magnitudes depending on position is formed around the magnetic scale 20.

The sensor 50 is disposed opposite the magnetic scale 20. The sensor 50 includes a magnetoresistance sensor 51, a supporting frame 52 supporting the magnetoresistance sensor 51, and a terminal 53 that outputs a signal from the magnetoresistance sensor 51. The magnetoresistance sensor 51 senses a change in the magnetic field formed by the magnetic scale 20. A signal processing unit (not shown) measures a moving distance and a position of the magnetic scale 20 from the signal sensed by the magnetoresistance sensor 51. The magnetoresistance sensor 51 is disposed spaced apart form the magnetic scale 20 at a predetermined interval so as to be most appropriate for detection of a position in consideration of a performance of the magnetoresistance sensor 51 and a magnitude of the magnetic field formed by the magnetic scale 20. In this regard, a minute difference in a distance between the magnetoresistance sensor 51 and the magnetic scale 20 may significantly affect position detection precision, and thus the distance between the magnetoresistance sensor 51 and the magnetic scale 20 needs to be precisely adjusted.

The magnetoresistance sensor 51 includes a plurality of resistors that are arranged along a direction in which the magnetic scale 20 moves, that is, in the first direction. The number of resistors may be two to eight, but the invention is not limited thereto. A distance between each resistor and the magnetic scale 20 needs to be substantially consistent. However, when the magnetoresistance sensor 51 is not parallel to the magnetic scale 20 and is inclined, the distance between each resistor and the magnetic scale 20 varies, and thus a signal may be distorted, thereby reducing position detection precision measured using the signal.

For example, when signals of A- and B-phases that have a sine wave form and have a ¼ wavelength phase difference are obtained using four resistors, if distances between each of the resistors and the magnetic scale 20 differ, the sine wave forms of the A- and B-phases are distorted and the phase difference between the A- and B-phases may be changed. Accordingly, a position measured using the signals of A- and B-phases has an error.

The first adjustment portion 30 is coupled to the base 10 so as to be capable of adjusting a distance with respect to the base 10, and the sensor 50 is rotatably coupled to the first adjustment portion 30.

The first adjustment portion 30 includes a support portion 31 and a first adjusting member 32. The support portion 31 includes a first coupling hole 37 and a second coupling hole 38 that respectively correspond to a first boss 17 and a second boss 18 disposed in the base 10. The first coupling hole 37 and the second coupling hole 38 in the support portion 31 are respectively coupled to the first boss 17 and the second boss 18, and thus the support portion 31 is moveably coupled to the base 10. The number of first and second bosses 17 and 18 and the first and second coupling holes 37 and 38 may be two or more. The base 10 includes an opening C in an area corresponding to the sensor 50 that couples to the first adjustment portion 30.

The sensor 50 includes a first protruding portion 55 at one side thereof, wherein the first protruding portion 55 protrudes in a direction perpendicular to a surface on which the magnetoresistance sensor 51 is disposed. An area of the support portion 31 includes a second groove portion 35 corresponding to the first protruding portion 55, and the first protruding portion 55 is inserted into the second groove portion 35, and thus the sensor 50 is rotatably coupled to the support portion 31. However, the invention is not limited thereto, and the sensor 50 may include a groove and the support portion 31 may include a protruding portion.

The first adjusting member 32 may be a bolt that penetrates a first through-hole 33 formed in the support portion 31 and is inserted into a first groove 13 formed in the base 10, wherein a plurality of thread grooves are formed in an inner surface of the first groove 13. A first elastic member 63 may be disposed between the base 10 and the support portion 31. Accordingly, a distance between the support portion 31 and the base 10 may be adjusted by adjusting an extent to which the first adjusting member 32 is inserted into the first groove 13 formed in the base 10. Because the distance between the base 10 and the magnetic scale 20 is not changed, and the sensor 50 is coupled to the support portion 31, a distance between the magnetic scale 20 and the sensor 50 may be adjusted by adjusting the first adjusting member 32.

A second adjustment portion 40 includes a second adjusting member 41 and a power transmitting member 42. The second adjusting member 41 may be a bolt that penetrates a second through-hole 34 formed in the support portion 31 and is inserted into a third groove 44 formed in the power transmitting member 42, wherein a plurality of thread grooves are formed in an inner surface of the third groove 44.

A second elastic member 64 may be disposed between the support portion 31 and the power transmitting member 42. Accordingly, a distance between the support portion 31 and the power transmitting member 42 may be adjusted by adjusting an extent to which the second adjusting member 41 is inserted into the power transmitting member 42.

The power transmitting member 42 includes a second protruding portion 46 on a surface perpendicular to a surface in which the third groove 44 is formed. The second protruding portion 46 penetrates a third through-hole 56 formed from the other side opposite to a side at which the first protruding portion 55 of the sensor 50 is disposed, wherein the third through-hole 56 is formed in a direction perpendicular to the surface on which the magnetoresistance sensor 51 is disposed. The second protruding portion 46 penetrates the third through-hole 56 and is inserted into a guide groove 36 formed in the support portion 31 and corresponding to the second protruding portion 46. The guide groove 36 extends in a second direction crossing the first direction, which is a direction in which the magnetic scale 20 moves, that is, the Z-axis direction, so as to support the second protruding portion 46 to move in the second direction. The guide groove 36 may be omitted.

The power transmitting member 42 is moved in the second direction (a Y-axis direction) by the second adjusting member 41, and the sensor 50 that couples to the second protruding portion 46 of the power transmitting member 42 by the third through-hole 56 moves in the second direction by receiving power from the power transmitting member 42. A side of the sensor 50 is connected to the support portion 31, and the other side thereof is rotated by the second adjustment portion 40 including the second adjusting member 41 and the power transmitting member 42, and thus the sensor 50 rotates about the first protruding portion 55 included in the sensor 50. Accordingly, an angle between the magnetoresistance sensor 51, which is included in the sensor 50, and the magnetic scale 20 may be adjusted.

In the current embodiment of the invention, the power transmitting member 42 includes the second protruding portion 46 and the sensor 50 includes the third through-hole 56. However, the invention is not limited thereto, and the power transmitting member 42 may include a groove or a through-hole, and the sensor 50 may include a protruding portion.

Figure 3:
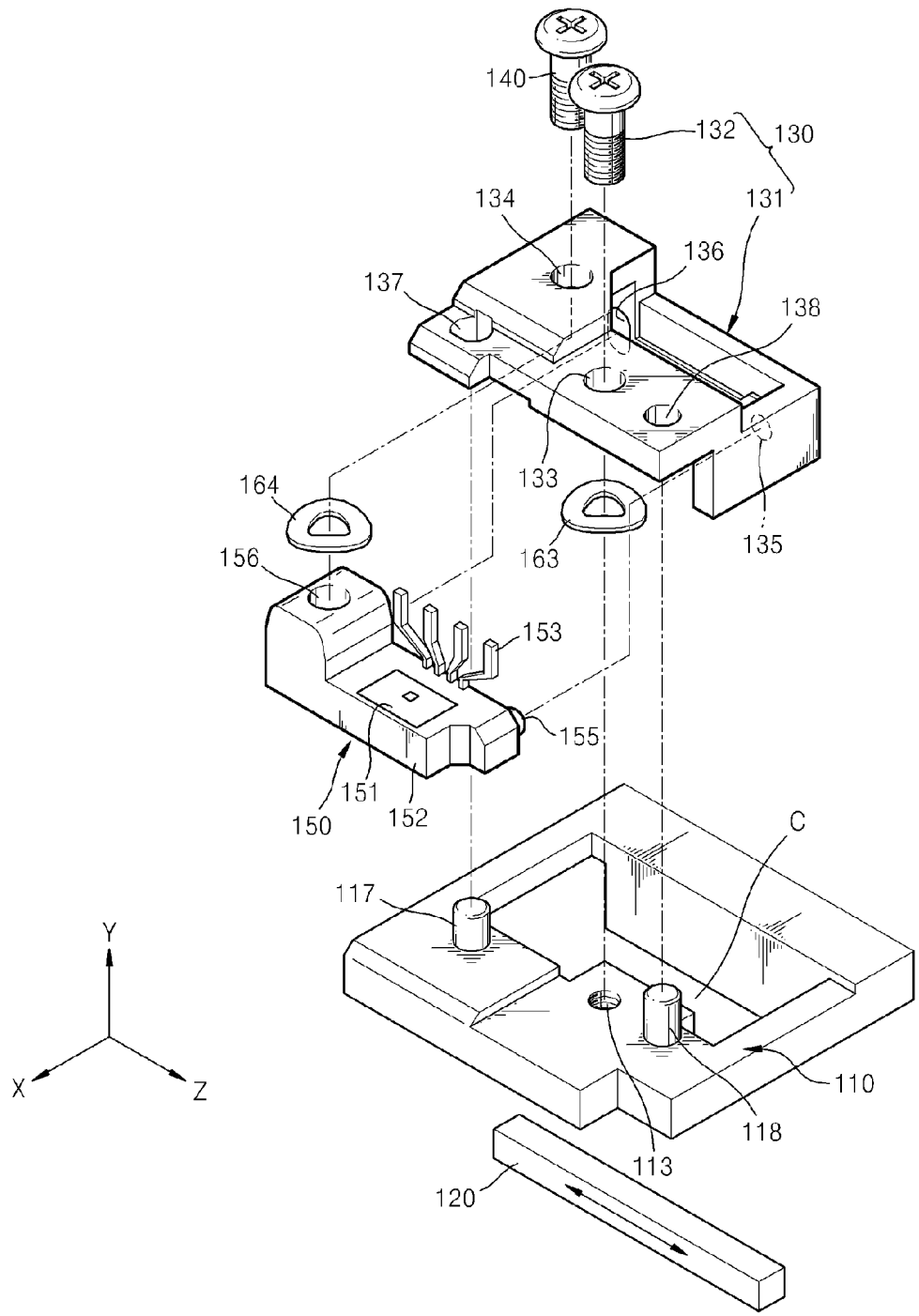
FIG. 3 is an exploded view of a position detecting apparatus, according to another embodiment of the invention.

FIG. 3 is an exploded view of a position detecting apparatus, according to another embodiment of the invention. Hereinafter, only differences between the current embodiment and the embodiment described above with reference to FIGS. 1 and 2 will be described.

Referring to FIG. 3, the configuration of the current embodiment is the same as that of the embodiment described above with reference to FIGS. 1 and 2 except for the configuration of a second adjustment portion 140. The second adjustment portion 140 may be a bolt that penetrates a second through-hole 134 formed in a support portion 131 and is inserted into a third through-hole 156 in which a plurality of thread grooves are formed in an inner surface of the third through-hole 156. The third through-hole 156 corresponds to the second adjustment portion 140 and is formed in a surface parallel to a surface on which a magnetoresistance sensor 151 of a sensor 150 is disposed. The third through-hole 156 may be formed as a groove corresponding to the second adjustment portion 140 instead of as a hole.

In the current embodiment, an angle of the sensor 150 inclined with respect to a magnetic scale 120 may be adjusted by directly adjusting a distance between the support portion 131 and the sensor 150, without including the power transmitting member 42 illustrated in FIG. 1. A second elastic member 164 may be disposed between the support portion 131 and the sensor 150.

Figure 4:
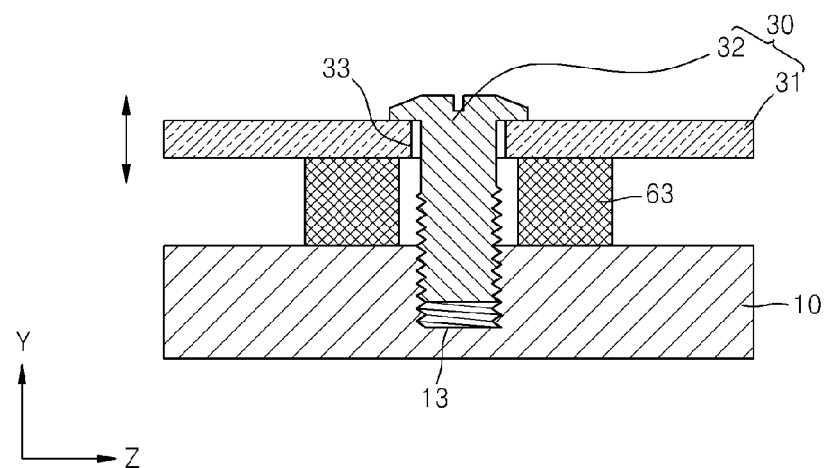
FIG. 4 is a partial cross-sectional view of the position detecting apparatus of FIGS. 1 and 2 taken along a line IV-IV of FIG. 2.

FIG. 4 is a partial cross-sectional view of the position detecting apparatus of FIGS. 1 and 2 taken along a line IV-IV of FIG. 2. Referring to FIG. 4, the first adjusting member 32 penetrates the first through-hole 33 formed in the support portion 31 and is inserted into the first groove 13 disposed in the base 10, wherein the plurality of thread grooves are formed in the inner surface of the first groove 13. The elastic member 63 is disposed between the support portion 31 and the base 10. A distance between the support portion 31 and the base 10 is adjusted by adjusting an extent to which the first adjusting member 32 is inserted into the first groove 13. The elastic member 63 may be formed of a pin spring manufactured by twisting a steel ring or an elastic material such as rubber, and thus the distance between the support portion 31 and the base 10 may be precisely adjusted and the support portion 31 may be stably supported by the base 10. The first adjusting member 32 may simultaneously perform adjustment of the distance and coupling between the support portion 31 and the base 10.

Figure 5:
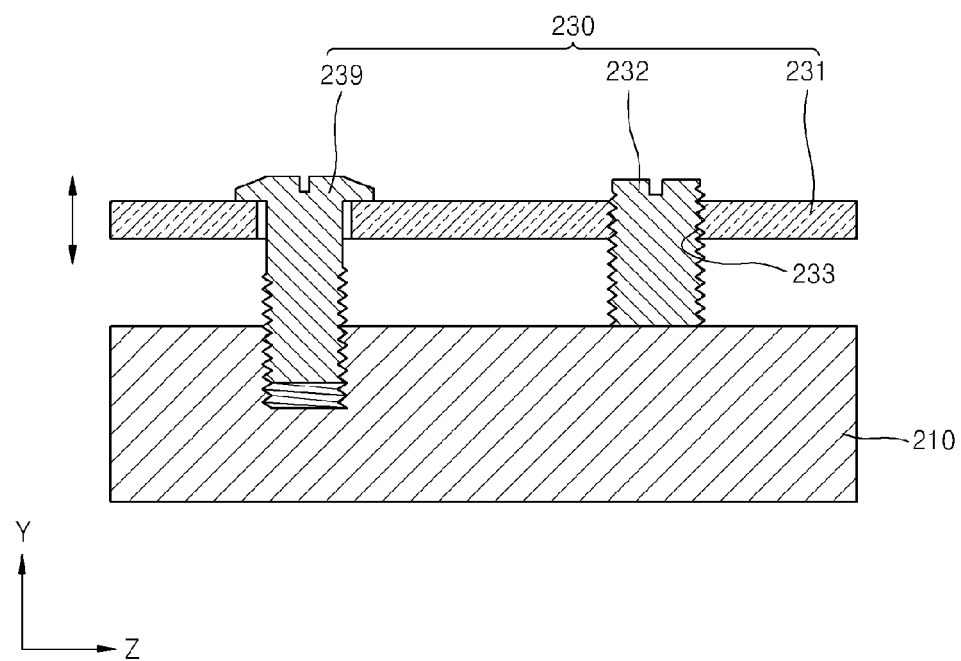
FIG. 5 is a partial cross-sectional view of a position detecting apparatus, according to yet another embodiment of the invention.

FIG. 5 is a partial cross-sectional view of a position detecting apparatus, according to yet another embodiment of the invention. Referring to FIG. 5, a first adjustment portion 230 includes a support portion 231, a first adjusting member 232, and a coupling member 239. The first adjusting member 232 and the coupling member 239 may be bolts, and the first adjusting member 232 penetrates a first through-hole 233 formed in the support portion 231 so as to contact a base 210, wherein a plurality of thread grooves are formed in an inner surface of the first through-hole 233. The first adjusting member 232 is screw-coupled to the first through-hole 233, and thus a position of the first adjusting member 232 corresponding to the first through-hole 233 is changed by adjusting the first adjusting member 232. Accordingly, a distance between the support portion 231 and the base 210 varies by adjusting the first adjusting member 232.

The coupling member 239 is used to couple the support portion 231 and the base 210.

Figure 6:
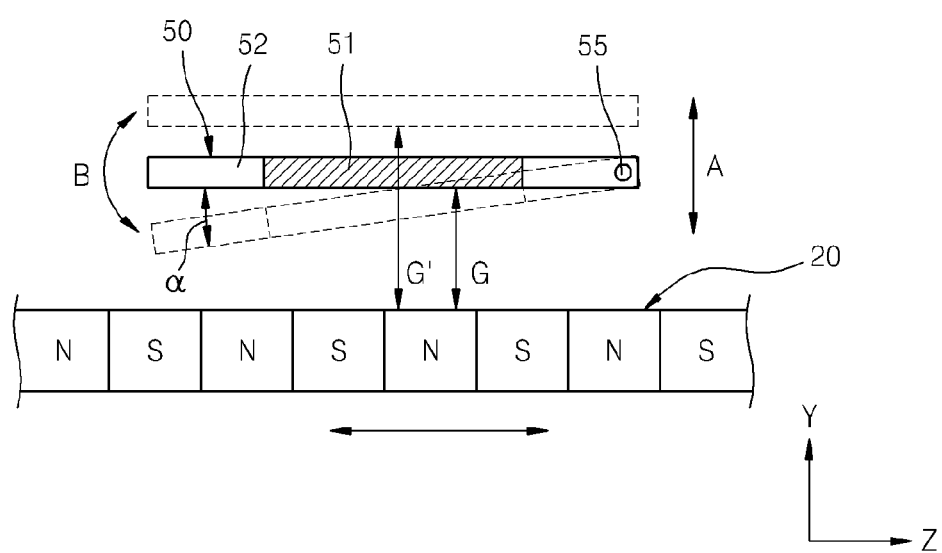
FIG. 6 is a conceptual diagram showing an operational principle of the position detecting apparatuses illustrated in FIGS. 1, 2 and 3.

FIG. 6 is a conceptual diagram showing an operational principle of the position detecting apparatuses illustrated in FIGS. 1, 2 and 3.

The magnetic scale 20 may move in the first direction (the Z-axis direction), and N-poles and S-poles are alternately disposed in the first direction. The sensor 50 is disposed opposite the magnetic scale 20. In order to increase position detection precision, a distance G between the sensor 50 and the magnetic scale 20 needs to be properly adjusted according to a performance of the magnetoresistance sensor 51 and a magnitude of the magnetic field formed by the magnetic scale 20. The sensor 50 may be moved in an arrow direction A by the first adjustment portion 30 of FIG. 1. As the sensor 50 moves, the distance G between the sensor 50 and the magnetic scale 20 is changed to a distance G'. In this regard, the distance G' may be greater or less than the distance G.

After the distance G between the sensor 50 and the magnetic scale 20 is adjusted, an angle $\alpha$ between the sensor 50 and the magnetic scale 20 is adjusted. The magnetoresistance sensor 51 includes a plurality of resistors (not shown) that are arranged along a direction in which the magnetic scale 20 moves. A distance between each resistor and the magnetic scale 20 needs to be consistent, and thus the sensor 50 and the magnetic scale 20 need to be disposed substantially parallel to each other.

The sensor 50 is coupled to the support portion 31 so as to be capable of rotating about the first protruding portion 55 disposed at one side of the sensor 50, and the second adjustment portion 40 of FIG. 1 moves the other side opposite to the one side of the sensor 50 in an arrow direction B. A moving distance of the sensor 50 corresponds to the angle $\alpha$ between the sensor 50 and the magnetic scale 20, and thus the angle $\alpha$ between the sensor 50 and the magnetic scale 20 may be adjusted by the movement of the sensor 50.

Figure 7:
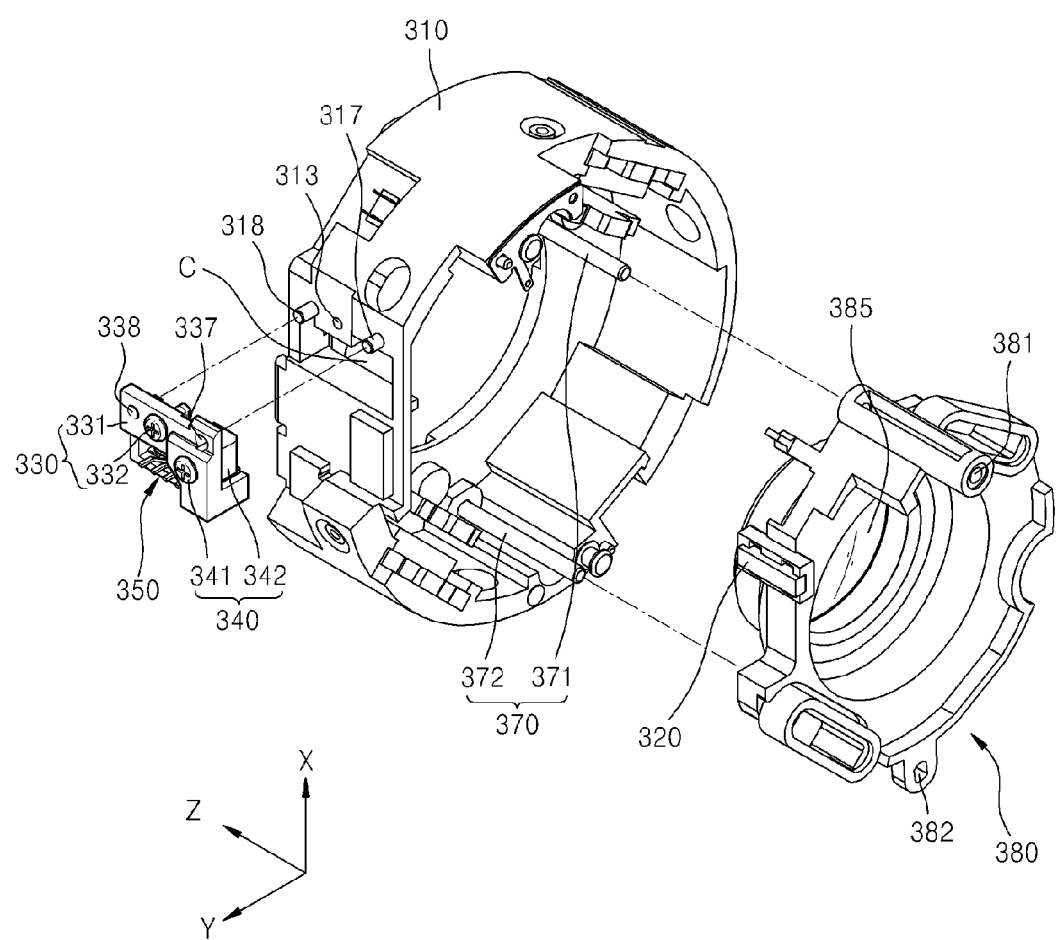
FIG. 7 is an exploded view of a lens barrel assembly including the position detecting apparatus illustrated in FIGS. 1 and 2.
Figure 8:
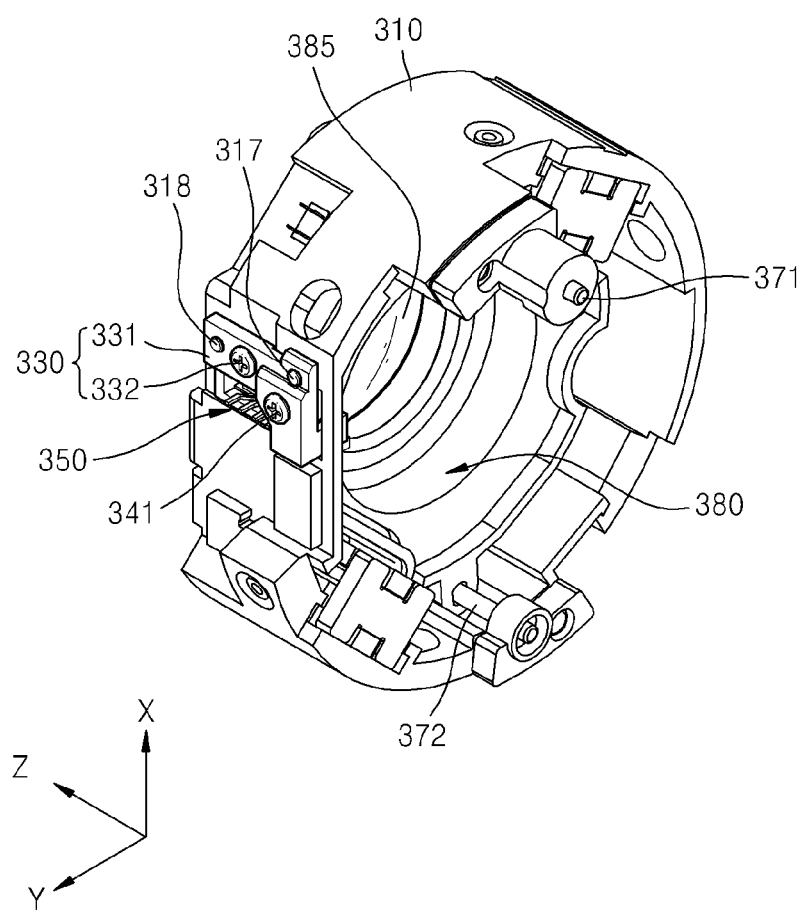
FIG. 8 is a perspective view of the lens barrel assembly of FIG. 7 formed by assembling the components illustrated in FIG. 7.

FIG. 7 is an exploded view of a lens barrel assembly including the position detecting apparatus illustrated in FIGS. 1 and 2. FIG. 8 is a perspective view of the lens barrel assembly of FIG. 7 formed by assembling the components illustrated in FIG. 7.

The lens barrel assembly according to the current embodiment includes a base 310, a movable barrel 380 supporting an optical element 385, movable in a first direction (a Z-axis direction) with respect to the base 310, and including a magnetic scale 320 on an outer circumferential surface of the movable barrel 380, a first adjustment portion 330 coupled to the base 310 to adjust a distance with respect to the base 310, and a sensor 350 rotatably coupled to the first adjustment portion 330 and disposed to face the magnetic scale 320 to detect a change in a position of the magnetic scale 320. Also, the lens barrel assembly of the current embodiment includes a guide portion 370 installed in the base 310 and moveably supporting the movable barrel 380 in the first direction (the Z-axis direction).

The base 310 is formed in a cylindrical shape so as to surround components included in the lens barrel assembly. The movable barrel 380 supporting the optical element 385 is disposed in the base 310. The optical element 385 is an element for transmitting light and may be a lens for focusing or zooming. However, the invention is not limited thereto, and the optical element 385 may include an iris or a filter. The movable barrel 380 is disposed along an edge of the optical element 385 so as to support the optical element 385.

The guide portion 370 installed in the base 310 extends in the first direction (the Z-axis direction) and moveably supports the movable barrel 380 in the first direction (the Z-axis direction), which is an optical axis direction. As the movable barrel 380 moves along the guide portion 370, the optical element 385 supported by the movable barrel 380 may perform focusing or zooming.

The guide portion 370 includes a first guide portion 371 and a second guide portion 372 disposed to correspond to the first guide portion 371 about an optical axis. The movable barrel 380 includes a first guide hole 381 into which the first guide portion 371 is inserted and a second guide hole 382 into which the second guide portion 372 is inserted. In this regard, a driving unit (not shown) may be disposed on a lateral surface of the first guide portion 371 so as to move the movable barrel 380.

In the current embodiment, the movable barrel 380 includes the first and second guide holes 381 and 382. However, the invention is not limited thereto, and the movable barrel 380 may include a guide groove instead of a guide hole to guide the movable barrel 380 in the first direction.

The driving unit (not shown) for moving the movable barrel 380 may be a voice coil motor (VCM) including a driving coil and a driving magnet. However, the invention is not limited thereto, and the driving unit may be a piezo electric actuator or an assembly of a step motor and a gear.

The first adjustment portion 330 is coupled to the base 310 so as to adjust a distance with respect to the base 310. The sensor 350 is rotatably coupled to the first adjustment portion 330. The base 310 includes an opening C in an area corresponding to the sensor 350.

The first adjustment portion 330 includes a support portion 331 coupled to the sensor 350 and a first adjusting member 332 for adjusting a distance between the support portion 331 and the base 310 by moving the support portion 331 in a direction crossing the direction (the Z-axis direction) in which the movable barrel 380 moves. A second adjustment portion 340 for adjusting a rotation angle of the sensor 350 is coupled to the first adjustment portion 330.

The magnetic scale 320 is disposed at one side of the movable barrel 380. The magnetic scale 320 is disposed to face the sensor 350 exposed by the opening C formed in the base 310. That is, since the movable barrel 380 moves in the base 310 having a cylindrical shape, the magnetic scale 320 is disposed on a surface opposite to the base 310 of the movable barrel 380, and thus a change in a magnetic field generated by the magnetic scale 320 may be detected by the sensor 350.

In this regard, after the support portion 331 is coupled to the base 310 so as to be capable of moving, a distance between the magnetic scale 320 and the sensor 350 may be adjusted by the first adjusting member 332, and an angle between the magnetic scale 320 and the sensor 350 may be adjusted by the second adjustment portion 340, and thus a position of the movable barrel 380 to which the magnetic scale 320 is coupled may be precisely detected. An optical element, such as a focus lens and/or a zoom lens, is coupled to the movable barrel 380, and thus the lens barrel assembly, which may be used in a high performance photographing apparatus, may be realized by precisely detecting and controlling a position of the focus lens and/or the zoom lens.

In the above-described position detecting apparatus, a distance and angle between a sensor and a magnetic scale can be adjusted to precisely detect a position of a movable member.

Also, a barrel assembly including the position detecting apparatus can precisely detect a position of a movable optical element, thereby improving an optical performance.

Furthermore, the invention provides a position detecting apparatus that is modularized to independently adjust a distance and an angle between a sensor unit and a magnetic scale, thereby reducing a size of a lens barrel assembly including the position detecting apparatus.

The embodiments disclosed herein may include a memory for storing program data, a processor for executing the program data to implement the methods and apparatus disclosed herein, a permanent storage such as a disk drive, a communication port for handling communication with other devices, and user interface devices such as a display, a keyboard, a mouse, etc. When software modules are involved, these software modules may be stored as program instructions or computer-readable codes, which are executable by the processor, on a non-transitory or tangible computer-readable media such as a read-only memory (ROM), a random-access memory (RAM), a compact disc (CD), a digital versatile disc (DVD), a magnetic tape, a floppy disk, an optical data storage device, an electronic storage media (e.g., an integrated circuit (IC), an electronically erasable programmable read-only memory (EEPROM), a flash memory, etc.), a quantum storage device, a cache, and/or any other storage media in which information may be stored for any duration (e.g., for extended time periods, permanently, for brief instances, for temporary buffering, for caching, etc.). As used herein, a computer-readable storage medium expressly excludes any computer-readable media on which signals may be propagated. However, a computer-readable storage medium may include internal signal traces and/or internal signal paths carrying electrical signals thereon.

Any references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of this disclosure, reference has been made to the embodiments illustrated in the drawings, and specific language has been used to describe these embodiments. However, no limitation of the scope of this disclosure is intended by this specific language, and this disclosure should be construed to encompass all embodiments that would normally occur to one of ordinary skill in the art in view of this disclosure.

Disclosed embodiments may be described in terms of functional block components and various processing steps. Such functional blocks may be realized by any number of hardware and/or software components configured to perform the specified functions. For example, the embodiments may employ various integrated circuit components (e.g., memory elements, processing elements, logic elements, look-up tables, and the like) that may carry out a variety of functions under the control of one or more processors or other control devices. Similarly, where the elements of the embodiments are implemented using software programming or software elements, the embodiments may be implemented with any programming or scripting language such as C, C++, Java, assembler, or the like, using any combination of data structures, objects, processes, routines, and other programming elements. Functional aspects may be implemented as instructions executed by one or more processors. Furthermore, the embodiments could employ any number of conventional techniques for electronics configuration, signal processing, control, data processing, and the like. The words "mechanism" and "element" are used broadly and are not limited to mechanical or physical embodiments, but can include software routines in conjunction with processors, etc.

The particular implementations shown and described herein are illustrative examples and are not intended to otherwise limit the scope of this disclosure in any way. For the sake of brevity, conventional electronics, control systems, software development, and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the embodiments unless the element is specifically described as "essential" or "critical".

The use of the terms "a," "an," "the," and similar referents in the context of describing the embodiments (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. The steps of all methods described herein can be performed in any suitable order unless otherwise indicated herein or otherwise clearly contradicted by context. Moreover, one or more of the blocks and/or interactions described may be changed, eliminated, sub-divided, or combined; and disclosed processes may be carried out sequentially and/or carried out in parallel by, for example, separate processing threads, processors, devices, discrete logic, circuits, etc. The examples provided herein and the exemplary language (e.g., "such as" or "for example") used herein are intended merely to better illuminate the embodiments and does not pose a limitation on the scope of this disclosure unless otherwise claimed. In view of this disclosure, numerous modifications and adaptations will be readily apparent to those skilled in this art without departing from the spirit and scope of this disclosure.

What is claimed is:

1. A position detecting apparatus comprising:
    a base;
    a magnetic scale spaced apart from the base by a first predetermined distance and movable in a first direction;
    a first adjustment portion coupled to the base to adjust a second distance from the base;
    a sensor rotatably coupled to the first adjustment portion and that senses a change in a position of the magnetic scale, and
    a second adjustment portion moveably coupled to the first adjustment portion to adjust a rotation angle of the sensor with respect to the magnetic scale.

2. The position detecting apparatus of claim 1, wherein the first adjustment portion comprises:
    a support portion coupled to the sensor; and
    a first adjusting member to adjust the second distance between the support portion and the base by moving the support portion in a second direction crossing the first direction.

3. The position detecting apparatus of claim 2, wherein the first adjusting member is a bolt, and the support portion comprises a first through-hole corresponding to the first adjusting member.

4. The position detecting apparatus of claim 3, wherein the base comprises a thread groove corresponding to the first through-hole and screw-coupled to the first adjusting member.

5. The position detecting apparatus of claim 4, further comprising a first elastic member between the base and the support portion.

6. The position detecting apparatus of claim 1, wherein the sensor comprises:
    a magnetoresistance sensor to sense a change in a magnetic field generated due to movement of the magnetic scale; and
    a supporting frame to support the magnetoresistance sensor and rotatably coupled to the first adjustment portion.

7. The position detecting apparatus of claim 1, wherein one side of the sensor is rotatably coupled to the first adjustment portion, and the other side thereof rotates about the one side by the second adjustment portion.

8. The position detecting apparatus of claim 7, wherein the second adjustment portion comprises a second adjusting member, and the second adjusting member is a bolt.

9. The position detecting apparatus of claim 8, wherein the sensor comprises a thread groove screw-coupled to the second adjusting member.

10. The position detecting apparatus of claim 9, further comprising a second elastic member between the second adjusting member and the sensor.

11. The position detecting apparatus of claim 8, further comprising a power transmitting member disposed between the second adjusting member and the sensor to transmit power.

12. A lens barrel assembly comprising:
    a base;
    a movable barrel supporting an optical element, movable in a first direction with respect to the base, and comprising a magnetic scale on an outer circumferential surface of the movable barrel;
    a first adjustment portion coupled to the base to adjust a distance with respect to the base; and
    a sensor rotatably coupled to the first adjustment portion and disposed to face the magnetic scale to detect a change in a position of the magnetic scale;

a second adjustment portion moveably coupled to the first adjustment portion to adjust a rotation angle of the sensor.

13. The lens barrel assembly of claim 12, wherein the first adjustment portion comprises:
a support portion coupled to the base; and
a first adjusting member to adjust a second distance between the support portion and the base by moving the support portion in a second direction crossing the first direction.

* * * * *